United States Patent
Rapanen et al.

(10) Patent No.: US 11,934,385 B2
(45) Date of Patent: Mar. 19, 2024

(54) METHOD AND A NODE FOR STORAGE OF DATA IN A NETWORK

(71) Applicant: Telia Company AB, Solna (SE)

(72) Inventors: Joni Rapanen, Vantaa (FI); Tomi Sarajisto, Helsinki (FI); Ilkka Keisala, Espoo (FI); Tero Jalkanen, Tuusula (FI)

(73) Assignee: TELIA COMPANY AB, Solna (SE)

( * ) Notice: Subject to any disclaimer, the term of this patent is extended or adjusted under 35 U.S.C. 154(b) by 90 days.

(21) Appl. No.: 16/838,587

(22) Filed: Apr. 2, 2020

(65) Prior Publication Data
US 2020/0320063 A1 Oct. 8, 2020

(30) Foreign Application Priority Data

Apr. 2, 2019 (FI) .................................. 20195264

(51) Int. Cl.
| | | |
|---|---|---|
| G06F 15/16 | (2006.01) | |
| G06F 16/23 | (2019.01) | |
| G06F 16/27 | (2019.01) | |
| H04L 67/104 | (2022.01) | |
| H04L 67/1095 | (2022.01) | |
| H04L 67/1097 | (2022.01) | |
| H04W 74/08 | (2009.01) | |

(52) U.S. Cl.
CPC .......... *G06F 16/2379* (2019.01); *G06F 16/27* (2019.01); *H04L 67/104* (2013.01); *H04L 67/1095* (2013.01); *H04L 67/1097* (2013.01); *H04W 74/08* (2013.01)

(58) Field of Classification Search
None
See application file for complete search history.

(56) References Cited

U.S. PATENT DOCUMENTS

| | | | |
|---|---|---|---|
| 10,299,128 B1* | 5/2019 | Suthar | H04L 9/0637 |
| 2017/0126577 A1 | 5/2017 | Sender et al. | |
| 2017/0126702 A1 | 5/2017 | Krishnamurthy | |
| 2017/0142204 A1* | 5/2017 | Kodaypak | H04W 8/22 |
| 2017/0180380 A1* | 6/2017 | Bagasra | H04L 63/101 |
| 2017/0302663 A1 | 10/2017 | Nainar et al. | |
| 2018/0041345 A1* | 2/2018 | Maim | G06F 21/6254 |
| 2018/0121620 A1* | 5/2018 | Bastide | G06F 16/334 |
| 2018/0212710 A1* | 7/2018 | Ronneke | H04W 88/16 |
| 2018/0220278 A1* | 8/2018 | Tal | G06Q 20/36 |
| 2018/0260212 A1* | 9/2018 | Wisnovsky | G06F 8/71 |

(Continued)

OTHER PUBLICATIONS

European Search Report issued in European Patent Application No. 20166930.6 dated Aug. 19, 2020.

(Continued)

*Primary Examiner* — Alex Gofman
(74) *Attorney, Agent, or Firm* — NIXON & VANDERHYE

(57) ABSTRACT

Disclosed is a method for storing data from a remote device in a blockchain database, the method, performed by a network node 112, including: receiving a message from the remote device, accessing the message through a control plane, obtaining data included in the message by the remote device, generating a data record including obtained data, and storing generated data record to a blockchain database. Also disclosed is are network node and a computer readable medium.

9 Claims, 4 Drawing Sheets

(56) References Cited

U.S. PATENT DOCUMENTS

| | | |
|---|---|---|
| 2018/0270710 A1 | 9/2018 | Hua et al. |
| 2018/0375840 A1 | 12/2018 | Moy et al. |
| 2019/0058709 A1 | 2/2019 | Kempf et al. |
| 2019/0090123 A1* | 3/2019 | Abraham ................ H04L 67/14 |

OTHER PUBLICATIONS

Office Action issued in European Patent Application No. 20166930.6 dated Aug. 20, 2021.

Kunz et al., "5G Evolution of Cellular IoT for V2X," 2018 IEEE Conference on Standards for Communications and Networking (CSCN), IEEE, Oct. 29, 2018, 6 pages, XP033480447.

Mafakheri et al., "Blockchain-based Infrastructure Sharing in 5G Small Cell Networks", 14th International Conference on Network and Service Management (CNSM 2018)—Poster Session, online, 2018, pp. 313-317, <URL:https://ieeexplore.ieee.org/document/8584920>.

Jover et al., "dHSS—Distributed Peer-to-Peer implementation of the LTE HSS based on the Bitcoin/Namecoin architecture", Proceedings of the IEEE International Conference on Communications Workshops (ICC 2016), online, 2016, pp. 354-359, <URL:https://ieeexplore.ieee.org/document/7503813>.

FI Search Report, dated Nov. 1, 2019, from corresponding FR application No. 20195264.

\* cited by examiner

METHOD AND A NODE FOR STORAGE OF DATA IN A NETWORK

TECHNICAL FIELD

The invention concerns in general the technical field of data communications. More particularly, the invention concerns storage of data received from remote device in a blockchain database.

BACKGROUND

Blockchain is a distributed ledger in which transactions are sequentially grouped into blocks. Each block is chained to the previous block and immutably recorded across a peer-to-peer network using cryptographic trust and assurance mechanisms. Blockchains may be deployed with varied levels of governance including public, private and community. Blockchain-based solutions differ from legacy business technology and processes. Blockchain applications are implemented in areas such as: identity registration and verification, ensuring integrity of devices, enabling identity data sharing while preserving privacy, mitigating trust and transparency issues by using the distributed/decentralized model and enhancing the ability to handle identities, attributes and relationships at massive scale.

A blockchain architecture provides a way to share a ledger that is updated every time a transaction occurs through peer-to-peer replication. Peer-to-peer replication means that each participant (node) in the network acts as both a publisher and a subscriber. Each node can receive or send transactions to other nodes, and the data is synchronized across the network as it is transferred. What has changed is that the transaction record is now shared and available to all parties.

On the other hand, a number of IoT (Internet of Things) devices is expected to reach billions. These devices have very low computing power as a complex system is not considered to perform most IoT tasks. Example of such an IoT device is a sensor device such as a temperature sensor, a tracking device, a metering device etc. with the capability to connect to the Internet. Many IoT devices comprise a microcontroller, sensors and SIM modules for wireless communications. Since the IoT devices typically are very simple devices, they do not have the processing power needed for performing encryption/decryption of data. Data originating from an IoT device may be stored in an IoT platform but said data is restricted to a specific type of information that normally relates to the function of the IoT device e.g. temperature data, timestamp etc. However, such IoT generated data is not trackable in a network and also can be easily manipulated since it is not protected.

Hence, there is need to introduce solutions by means of which it is possible to enrich the IoT generated data and to protect it in a network architecture.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is at least to present a method, a network node and a computer product storing data from a remote device to a blockchain database.

The objects of the invention are reached by a method, a network node and a computer program product as defined by the respective independent claims.

According to a first aspect, a method for storing data from a remote device in a blockchain database is provided, the method, performed by a network node, comprises: receiving a message from the remote device; accessing the message through a control plane; obtaining data included in the message by the remote device; generating a data record comprising obtained data; and storing generated data record to a blockchain database.

The method may further comprise: inquiring further data to be included in the data record from at least one of the following: an external system, a communication network.

The storing may further comprise: providing an indication of one or more parties with whom the data record is shared in the blockchain database.

The message may be received in a Non-Access Stratum (NAS) signaling.

Still further, the method may further comprise: generating a signal comprising the data to Service Capabilities Exposure Function, SCEF, over a Non-IP Data Delivery, NIDD.

According to a second aspect, a network node for storing data from a remote device in a blockchain database is provided, the network node comprises: at least one processor; at least one memory including computer program code; the at least one memory and the computer program code configured to, with the at least one processor, cause the network node to perform: receive a message from the remote device; access the message through a control plane; obtain data included in the message by the remote device; generate a data record comprising obtained data; and store generated data record to a blockchain database.

The network node may further be caused to perform: inquire further data to be included in the data record from at least one of the following: an external system, a communication network.

The network node may be arranged to perform the storing so that network node is further caused to: provide an indication of one or more parties with whom the data record is shared in the blockchain database.

The network node may also be arranged to receive the message in a Non-Access Stratum (NAS) signaling.

Still further, the network node may further be caused to perform: generate a signal comprising the data to Service Capabilities Exposure Function, SCEF, over a Non-IP Data Delivery, NIDD.

According to a third aspect, a computer program product is provided, the computer program product comprising instructions which, when executed by at least one processor of a network node, cause the network node to perform the method as defined above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 illustrates schematically a communication system into which the present invention may be implemented to.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

At least some aspects of the present invention relate to a solution allowing a device to send a small data transmission over a network using Non-Access Stratum (NAS) signaling. NAS protocol is a signaling protocol used between a UE and a network element, such as a mobility management entity. In an LTE network, NAS signaling is typically used for mobility management, and for support of session management between a UE and a Packet Data Network (PDN) gateway. In at least some embodiments of the present invention, NAS signaling may be used to carry Machine Type Communications (MTC) data transmissions. In other words, the small data transmissions for MTC may be encapsulated in NAS signaling messages and sent over the network. This is advantageous because a PDN connection does not need to be established or used in order for a UE to send MTC data over the network. Therefore, network resources do not need to be wasted in transporting MTC data over a PDN connection. Due to the small size of MTC data, NAS signaling may be used to transport the MTC data. This may save network resources especially when there is significant amount of MTC traffic, such as during peak times. For example, in some network technology the NAS signaling may e.g. support packet data units (PDU) of 2 kB at maximum. In case a larger amount of data is to be transmitted over the network technology in question it may be shared in a plurality of PDUs. Naturally, the size of the packet data unit is highly network technology dependent and may vary within limits defined by technological capabilities of the network.

Figure 1:
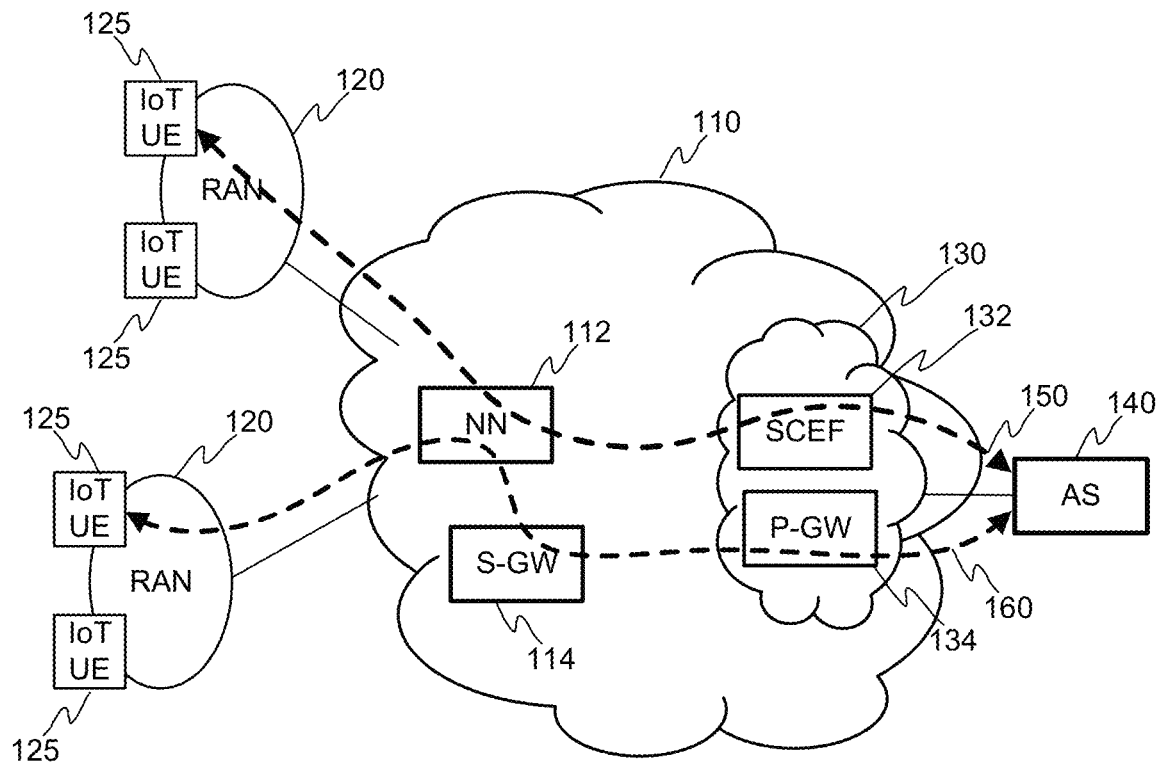

FIG. 1 illustrates schematically communication environment which may be considered as a communication system into which the present invention may be implemented to. The communication environment may comprise a mobile communication network comprising at least one core network 110 and at least one radio access network 120. The core network 110 may be considered as a telecommunication network's core part offering numerous services to the customers who are interconnected by the access network, such as radio access networks 120. A key function of the core network is to manage connections between different entities and manage the overall operation of the communication network in question. The radio access network 120, in turn, is a part of the network providing radio coverage to terminal devices for establishing connections to other entities connected either directly or indirectly to the mobile communication network.

The core network 110 may comprise one or more network nodes arranged to manage the operation of the communication network. In FIG. 1 it is illustrated a network node 112, representing e.g. a node called mobility management entity (MME), which may perform such a role in the network. In FIG. 1 it is also illustrated so-called Serving Gateway (SGW) as a core network component which is at least used for forwarding and routing data packets to and from radio access network 120 and packet data network gateway, PGW, 134.

The radio access network 120 may comprise base stations, such as eNodeBs, and necessary controllers by means of which the radio coverage may be established for the terminal devices. Hence, the radio access network 120 may provide communication connection to remote devices 125, denoted as IoT UEs in FIG. 1, residing in one or more radio access networks 120.

The communication system comprising the core network 110 and the ratio access network 120 may establish the radio coverage with any radio access technology including, 3G, 4G (or LTE), 5G etc.

In addition, the communication environment may comprise a domain called as an IoT (Internet of Things) domain 130 typically arranged in a core network 110, or to a packet core network. The IoT domain 130 refers to, in the context of the present invention, a number of network entities arranged to serve the remote devices 125. The IoT domain may be arranged to serve the remote devices as will be described. The IoT domain 130 may comprise nodes, such as Service Capabilities Exposure Function (SCEF) 132 and Packet Gateway (PGW) 134. An advantage of arranging the IoT domain 130 in the operator's network, such as in the core network, is that it is only accessible by the operator and behind the operator's network protection, even though the IoT domain 130 may also be arranged to be external to the operator's infrastructure. Moreover, the network entities belonging to the IoT domain in the non-limiting example may be entities also controlling other network traffic than the IoT traffic. Hence, the entities are not only dedicated to the IoT data traffic and/or the remote devices. Still further, according to the present invention at least one application server 140 may be arranged to serve the remote devices 125 in their task.

Still further, FIG. 1 illustrates schematically two data paths denoted with 150 and 160 through which a remote device 125 and an application server 140 may communicate with each other in a manner as is described herein. For example, the remote device 125 may be arranged to transmit in a predetermined schedule data to the application server 140. The first data path 150 may travel from a remote device 125 over a RAN 120 to core network and a network node 112 there. The network node 112 may be arranged to convey the signaling to SCEF 132 for finally taking the signaling to an application server 140. The second data path continues from network node 112 to the application server 140 through SGW 114 and PGW 134.

At least some aspects of the present invention may relate to a transfer of data from a remote device 125 to an application server 140. Specifically, the present invention is dedicated to transmitting small data between the entities. A non-limiting example of the small data may be sensor data, i.e. the remote device 125 may be a sensor arranged to measure a parameter within an environment it resides and transmit it in a manner as is described to the application server.

Figure 2A:
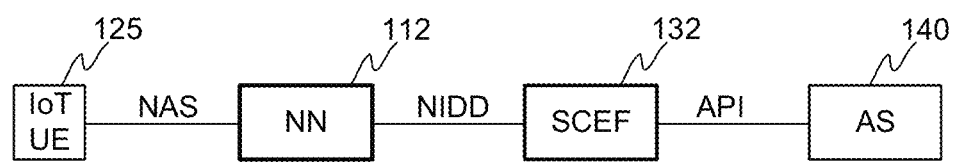
FIGS. 2A and 2B illustrate schematically examples of data paths between a remote device and an application server according to an embodiment of the invention.
Figure 2B:
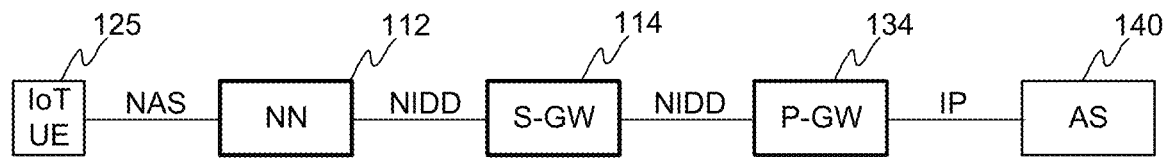

FIGS. 2A and 2B illustrate schematically data paths between a remote device 125 and an application server 140 wherein it is also illustrated a mechanism between the illustrated entities through which the data may be transferred.

FIG. 2A illustrates schematically an option to convey data from the remote device 125 to the application server 140 via SCEF 132. In this option the remote device 125 may be arranged to obtain data to be transmitted and to generate a signaling carrying the data over Non-Access-Stratum (NAS) to the network node 112. The NAS is a control layer used normally at least to manage the establishment of communication sessions and for maintaining continuous communications with the terminal device as it moves. As mentioned, the NAS may be used for carrying the data, such as sensor data measured by the remote device 125. In response to that the NAS signaling reaches the network node 112 over S1-MME interface, the network node 112 may be arranged to convey the received data to the application server 140 through SCEF 132. In order to do this the network node 112 may be configured to convey the encapsulated data in the NAS message through Non-IP Data Delivery (NIDD) to the SCEF 132. A T6a—Diameter interface is advantageously implemented at the network node 112. At SCEF 132 an application programming interface (API) is established between the SCEF 132 and the application server 140. In the described manner it is possible to transfer small data over NAS by utilizing SCEF 132, and especially SCEF rest applications there.

FIG. 2B illustrates schematically another option to convey data from the remote device 125 to the application server 140. Here, the remote device 125 may be arranged to obtain data to be transmitted and to generate a signaling carrying the data over Non-Access-Stratum (NAS) to the network node 112. In response to that the NAS signaling reaches the network node 112 over Signaling Radio Bearers (SRB), the network node 112 may be arranged to convey the received data to the application server 140 through a SGW 114 and a PGW 134. In order to do this the network node 112 may be configured to establish a packet-to-packet tunnel through the SGW 114 and a PGW 134 to the application server over SGi interface between the PGW 134 and the application server 140. In other words, the data may be conveyed as an IP data with NIDD inside SGi tunnel. The tunneling from the network node 112 to the SGW 114 and further from the SGW 114 to the PGW 134 may be implemented with GPRS Tunneling Protocol User Plane (GTP-U) which may be used to carry encapsulated Transport protocol data units (T-PDUs) and signaling messages between a given pair of GTP-U Tunnel Endpoints.

Figure 3A:
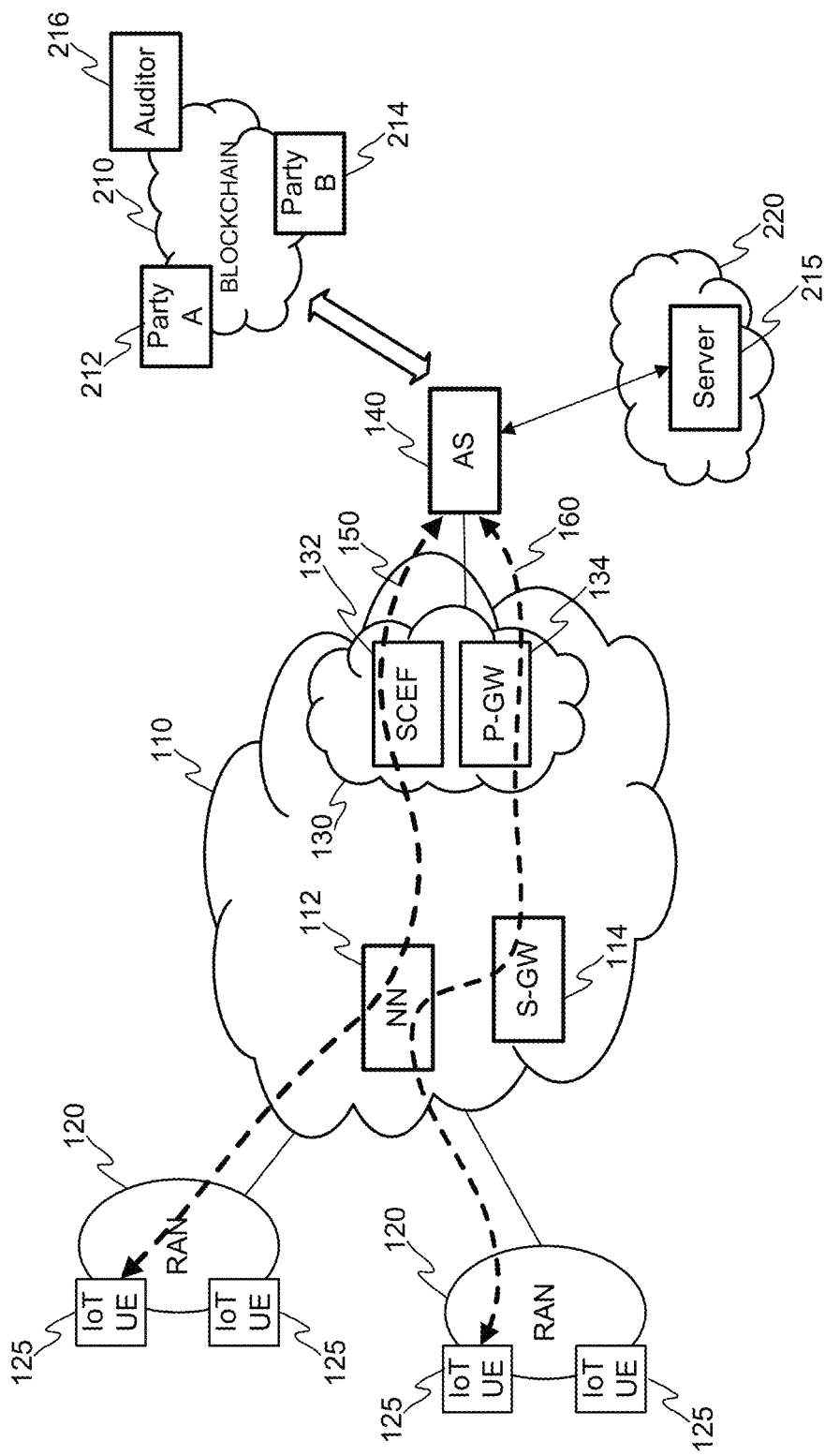
FIGS. 3A and 3B illustrate schematically some further aspects of a communication system according to an embodiment of the invention.
Figure 3B:
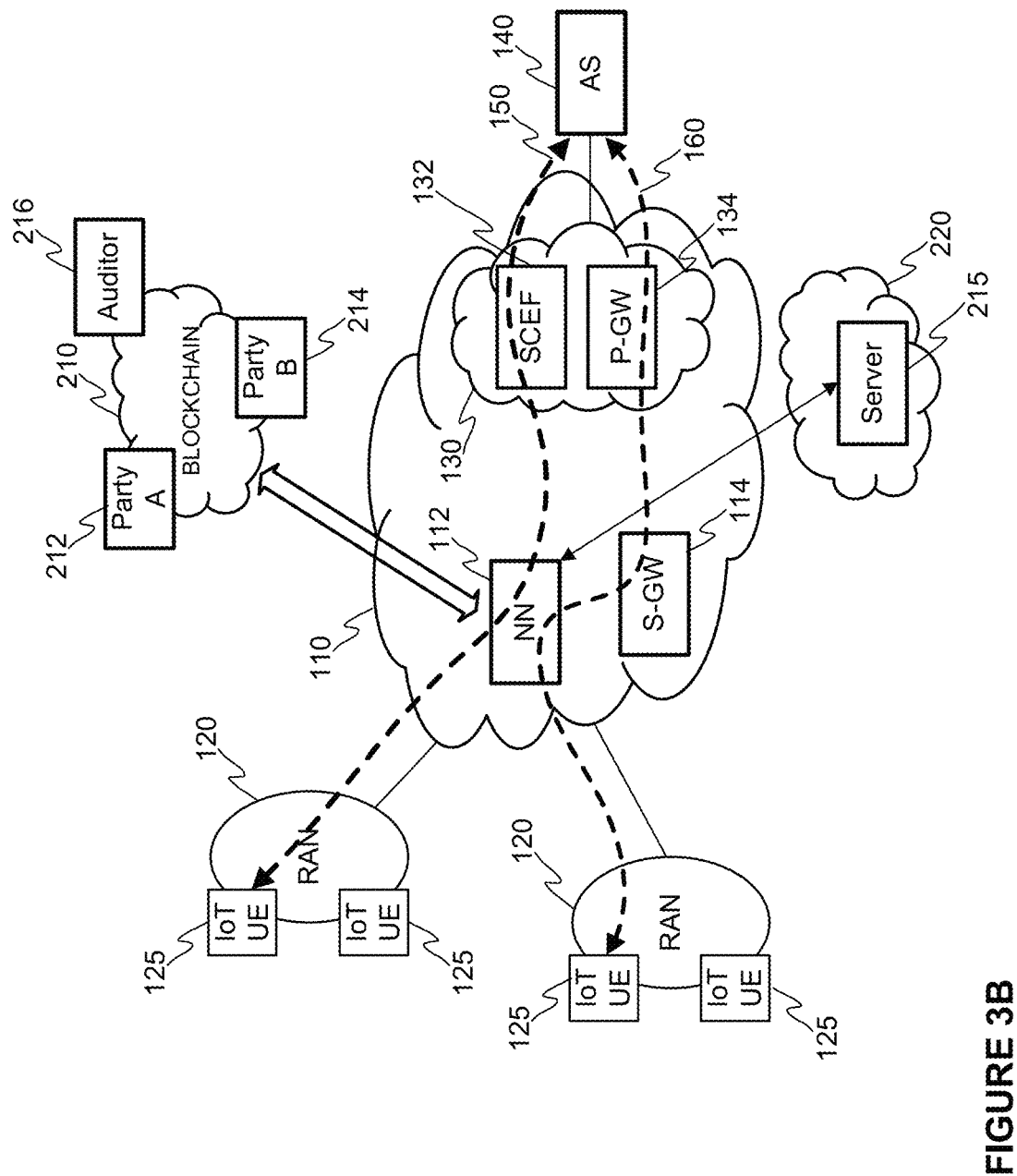

FIGS. 3A and 3B illustrate schematically some further aspects of the present invention. As schematically illustrated, the application server 140 serving at least one remote device 125 may be communicatively coupled to a blockchain database 210 to which several parties have access to (Party A 212, Party B 214, Auditor 216 etc.). The database is a time-stamped, non-repudiable database. It should be mentioned that any number of parties or participants may have access to the blockchain database 320. In the described manner it is possible to store the data received from one or more remote devices 125 to the blockchain database 210 and confirm a validity of the stored data by parties having access to it. In other words, the blockchain database 210 may comprise an entire logged history of transactions on the system. Each transaction processor on the system may maintain their own local copy of this database and consensus formation algorithms enable every copy to stay in sync. This allows the participants of the blockchain database to verify and audit transactions inexpensively (e.g. cold chain).

According to an embodiment of the invention the communication system may be arranged to include further data in a context of the data received from the remote devices 125, such as enriching the data received from the remote device 125. The further data may be retrieved, e.g. by the application server 140 as shown in FIG. 3A, from a server device 215 of an external system 220. For example, if the data received from the remote device 125 is a measurement representing a parameter, including e.g. timestamp, latitude, longitude, elevation, speed, direction vector, acceleration, pressure, temperature, humidity, light, radiation etc., of an environment where the remote device 125 resides, the application server 140 may e.g. inquire data from the server 215 relating to the location of the remote device 125 in question. A non-limiting example of such data may be weather data. In addition to this the application server 140 may inquire, or receive together with the data of the remote device 125, network data representing an aspect of the communication network. For example, the network node 112, such as MME, may be arranged to include the network data together with the data received from the remote device 125. The described pieces of data may be included in the data delivered to the blockchain database in order to provide enriched data to the participants of the blockchain database 210.

In the non-limiting example as described above, and in FIG. 3A, it is described that it is the application server 140 which is arranged to communicate with the blockchain database and with any other entities. In another embodiment, as schematically illustrated in FIG. 3B, the network node 112, or a corresponding entity, may be arranged to perform the task of obtaining the further data e.g. from other systems 220 and deliver it to the application server 140. In some further embodiment, the network node 112 may be arranged to communicate with the blockchain database 210. For example, the application server 140 may be arranged to control the operation, and even the delivery of the data to the blockchain database 210 by the network node 112.

According to an embodiment of the invention, the entity, such as the network node 112 or the application server 140, may be arranged to provide an indication of one or more parties with whom the data record is shared in the blockchain database 210. For example, the indication may be an identifier of the party in the network.

For sake of clarity it is worthwhile to mention that the network node 112 may be arranged to communicate with any other entities, such as with a subscriber register (e.g. HSS), OSS/BSS (Operations Support System/Business Support System) of an operator. etc., in order to communicate in the manner as described. The network node 112 may be provided with necessary service functions, such as DPI (Deep Packet Inspection) and firewall.

Still further, the data traffic as described herein between the remote devices 125 and the application server 140, or the blockchain database 210, may be bidirectional. In other words, the remote devices 125 may be controlled from the network side, such as from the application server 140 e.g. by utilizing the same communication channels as described. The control of the remote devices 125 shall be understood in a broad manner, also to comprise delivery of any information to the remote devices 125 without causing any control action of the devices as such.

Figure 4:
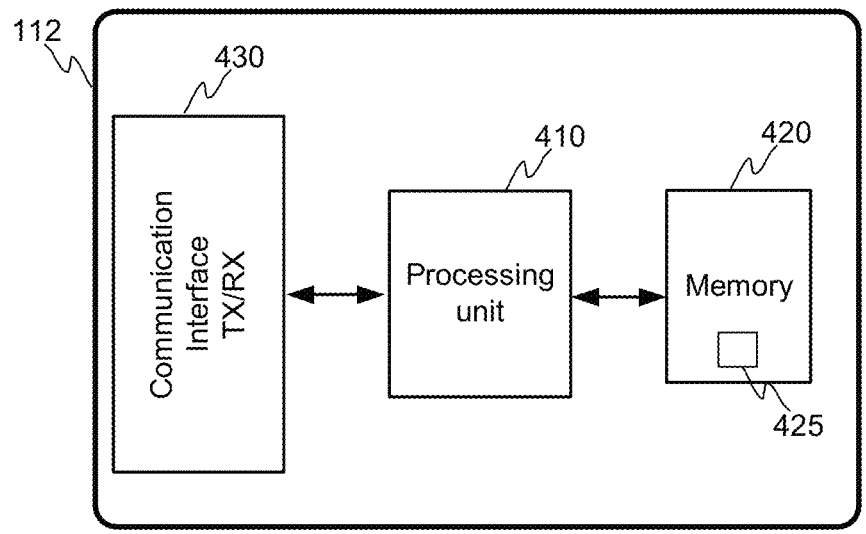
FIG. 4 illustrates schematically a network node according to an embodiment of the invention.

FIG. 4 illustrates a non-limiting example of a network node 112 as a block diagram. The network node 112 may e.g. perform an operation of a MME in a core network of a communication network. The network node 112 comprises a processing circuitry or a processing module or a processor 410; a memory module 420 storing at least computer program code 425 and a communication interface 430 comprising a receiver circuit or receiver module; a transmitter circuit or a transmitter module and/or a transceiver circuit or a transceiver module which may include transmitter circuit and receiver circuit. The network node 112 may comprise additional components not depicted in FIG. 4. The network node 112, by means of processor 410, is operative to: receive data packets from a remote device 125; access to message obtained through control plane; obtain sensor data in the message; possibly inquire further data from external entities, such as from operator system and/or from external system(s); and store generated data to a blockchain database. The network node 112 may also be operative to share the generated data with each party that has access to the blockchain database.

Figure 5:
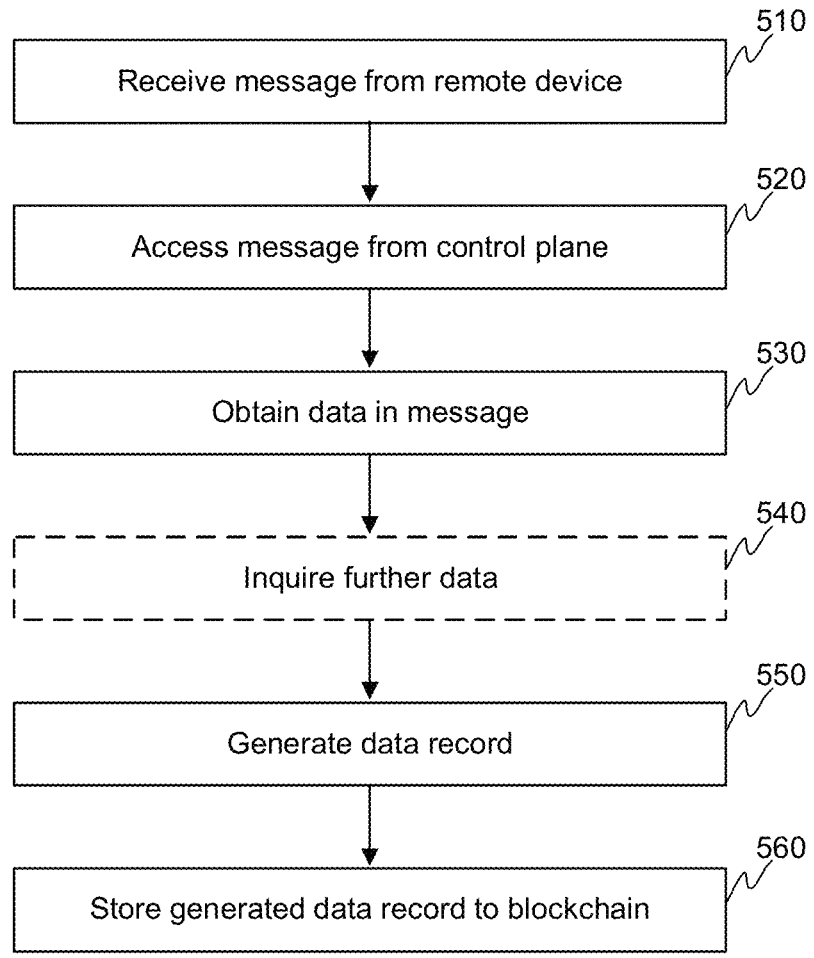
FIG. 5 illustrates schematically a method according to an embodiment of the invention.

Some further aspects of the present invention is now described by referring to FIG. 5 which illustrates the further aspects of the present invention in a form of a method. In step 510 a network node 112 receives data from a remote device 125. The network node 112 may be arranged to access 520 the message comprising the data from the remote device 125. The access of the message 520 may refer to an operation in which the network node 112 retrieves the messages, or data packets, comprising the data from the remote device 125 from a data flow. For example, the messages delivered over a control plane may be accessed with network probes. This corresponds to accessing the messages through the control plane, as mentioned. In response to a receipt of at least one such message the network node 112 may be arranged to obtain the data, i.e. payload data, of the remote device 125, such as a measurement data, from the message. In other words, a result of the step 530 may e.g. be that a processor 410 possesses e.g. raw data received from the remote device 125. In some embodiments of the invention the network node 112 may be arranged to inquire 540 further data e.g. related to the data obtained from the message as described. Next, a data record may be generated 550 from the data. In case the network node 112 is not arranged to inquire further data, the data record may comprise the data obtained from the message received from the remote device 125. On the other hand, if the network node 112 is arranged to perform the step 540 of FIG. 5, the network node 112 may be arranged to generate data record 550 representing a plurality of data obtained by the network node 112. For example, the further data inquire from other sources may be combined with the data received from the remote device 125. The combining of the data may e.g. refer to a generation of a data record comprising a plurality pieces of data received from a plurality of sources, as described. Alternatively or in addition, the generation of the data record may refer to enriching the data obtained from the message with the data inquired from other sources. In step 560, the generated data record is stored to blockchain.

Some aspects of the present invention may relate to a communication system implementing the functionality as described. Moreover, some aspects of the present invention may relate to a computer program product causing the network node 112 to perform as described.

The computer program product implemented with computer program code may be provided e.g. with at least one computer-readable non-transitory medium having the computer program code stored thereon, which computer program code, when executed by the processor causes the apparatus to perform the method. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

For sake of clarity it is worthwhile to mention that even it is mainly indicated in the description herein that the network node 112 corresponds to a MME of an Evolved Packet Core (EPC) in LTE wireless communication network the inventive idea is not limited only to such an implementation. For example, the functionality of the network node 112 may be shared between a plurality of entities implementing a task in the communication network in question. For example, the term "network node" shall, in the context of the present invention, be understood as a number of network functionalities implemented in 5G network comprising e.g. functionalities of Access and Mobility Management Function (AMF) and Session Management Function (SMF). In other words, the present invention may be implemented in the mentioned entities of the 5G network in order to implement the present invention in the 5G network.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for storing data from a remote device in a blockchain database, the method, performed by a network node, comprising:
   receiving a Non-Access Stratum (NAS) message from the remote device in a NAS signaling;
   accessing the NAS message through a control plane;
   obtaining data included in the NAS message by the remote device, the data being a measurement representing a parameter of an environment in which the remote device resides;
   transmitting the obtained data in the NAS message through Non-IP Data Delivery (NIDD) through at least one node of an Internet of Things (IoT) domain to an application server outside of the IoT domain;
   obtaining additional data related to a location of the remote device from the application server that inquires the additional data from a server device of an external system external to the application server, the server device being configured to maintain the additional data related to the location of the remote device, the additional data being associated with the data obtained from the message, the additional data being associated with the environment in which the remote device resides;
   generating a data record comprising the obtained data and the additional data; and
   transmitting the generated data record to the blockchain database to be stored, the blockchain database being accessible by a plurality of parties configured to access the blockchain database.

2. The method of claim 1, the method further comprising:
inquiring the additional data to be included in the data record from at least one of the following: the external system and a communication network.

3. The method of claim 2, wherein the storing further comprises:
providing an indication of one or more parties of the plurality of parties with whom the generated data record is shared in the blockchain database.

4. The method of claim 1, wherein the storing further comprises:
providing an indication of one or more parties of the plurality of parties with whom the generated data record is shared in the blockchain database.

5. A non-transitory computer-readable medium on which is stored a program comprising instructions which, when executed by at least one processor of the network node, cause the network node to perform the method according to claim 1.

6. A network node for storing data from a remote device in a blockchain database, the network node comprising:
at least one processor; and
at least one memory including computer program code;
the at least one memory and the computer program code configured to, with the at least one processor, cause the network node to:
receive a Non-Access Stratum (NAS) message from the remote device in a NAS signaling,
access the NAS message through a control plane,
obtain data included in the NAS message by the remote device, the data being a measurement representing a parameter of an environment in which the remote device resides,
transmit the obtained data in the NAS message through Non-IP Data Delivery (NIDD) through at least one node of an Internet of Things (IoT) domain to an application server outside of the IoT domain,
obtain additional data related to a location of the remote device from the application server that inquires the additional data from a server device of an external system external to the application server, the server device being configured to maintain the additional data related to the location of the remote device, the additional data being associated with the data obtained from the message, the additional data being associated with the environment in which the remote device resides,
generate a data record comprising the obtained data and the additional data, and
transmit the generated data record to the blockchain database to be stored, the blockchain database being accessible by a plurality of parties configured to access the blockchain database.

7. The network node of claim 6, the network node is further configured to:
inquire the additional data to be included in the data record from at least one of the following: the external system and a communication network.

8. The network node of claim 7, wherein the network node is configured to store so that the network node is further configured to:
provide an indication of one or more parties of the plurality of parties with whom the generated data record is shared in the blockchain database.

9. The network node of claim 6, wherein the network node is configured to store so that the network node is further configured to:
provide an indication of one or more parties of the plurality of parties with whom the generated data record is shared in the blockchain database.

* * * * *